United States Patent [19]
Hiroki et al.

[11] Patent Number: 5,559,770
[45] Date of Patent: Sep. 24, 1996

[54] AUTOMATIC GAIN CONTROL METHOD AND DEVICE FOR SERVO LOOP, AND INFORMATION RECORDING AND/OR REPRODUCTION APPARATUS

[75] Inventors: Tomoyuki Hiroki, Zama; Hisatoshi Baba, Yokohama, both of Japan

[73] Assignee: Canon Kabushiki Kaisha, Tokyo, Japan

[21] Appl. No.: 296,158

[22] Filed: Aug. 29, 1994

[30] Foreign Application Priority Data

Aug. 30, 1993 [JP] Japan .................................. 5-235893

[51] Int. Cl.$^6$ ...................................... G11B 7/095
[52] U.S. Cl. .................. 369/44.350; 369/44.360; 369/44.250
[58] Field of Search ............... 369/44.35, 44.36, 369/44.29, 44.25, 54, 44.27; 250/201.5

[56] References Cited

U.S. PATENT DOCUMENTS

| | | |
|---|---|---|
| 4,858,214 | 8/1989 | Baba .......................... 369/32 |
| 4,955,011 | 9/1990 | Baba .......................... 369/54 |
| 4,977,551 | 12/1990 | Minami et al. .................. 369/44.25 |
| 5,109,367 | 4/1992 | Yoshikawa ..................... 369/44.36 X |

*Primary Examiner*—W. R. Young
*Assistant Examiner*—Thang V. Tran
*Attorney, Agent, or Firm*—Fitzpatrick, Cella, Harper & Scinto

[57] ABSTRACT

In an automatic gain control device, an error signal generated based on output signals from a divided sensor is inputted to an operational amplifier. A sum signal of the output signals from the divided sensor is inputted to a multiplier. The error signal is divided by the sum signal by negatively feeding back an output signal from the operational amplifier to the operational amplifier via the multiplier. Two predetermined voltages are alternately applied to the multiplier in a state in which the sum signal is 0. The amplitudes of output signals from the automatic gain control device corresponding to the two voltages are detected. Input offsets of the operational amplifier and the multiplier are cancelled by calculating the input offsets of the operational amplifier and the multiplier on the basis of the detected amplitudes of the signals, the two predetermined voltages, and a gain of the multiplier.

15 Claims, 7 Drawing Sheets

FIG. 5
PRIOR ART $$Vofst = \frac{Vofst\,1}{G1 \cdot S2} + Vofst\,2$$

AUTOMATIC GAIN CONTROL METHOD AND DEVICE FOR SERVO LOOP, AND INFORMATION RECORDING AND/OR REPRODUCTION APPARATUS

BACKGROUND OF THE INVENTION

1. Field of the Invention

The present invention relates to an automatic gain control device for a servo loop, an apparatus and method for adjusting the gain of a servo loop of an optical information recording/reproduction apparatus, in particular, an apparatus and method for adjusting the gain of a focusing servo loop and a tracking servo loop, and an optical information recording/reproduction apparatus having an optical head which comprises the control device.

2. Background Art

Figure 1:
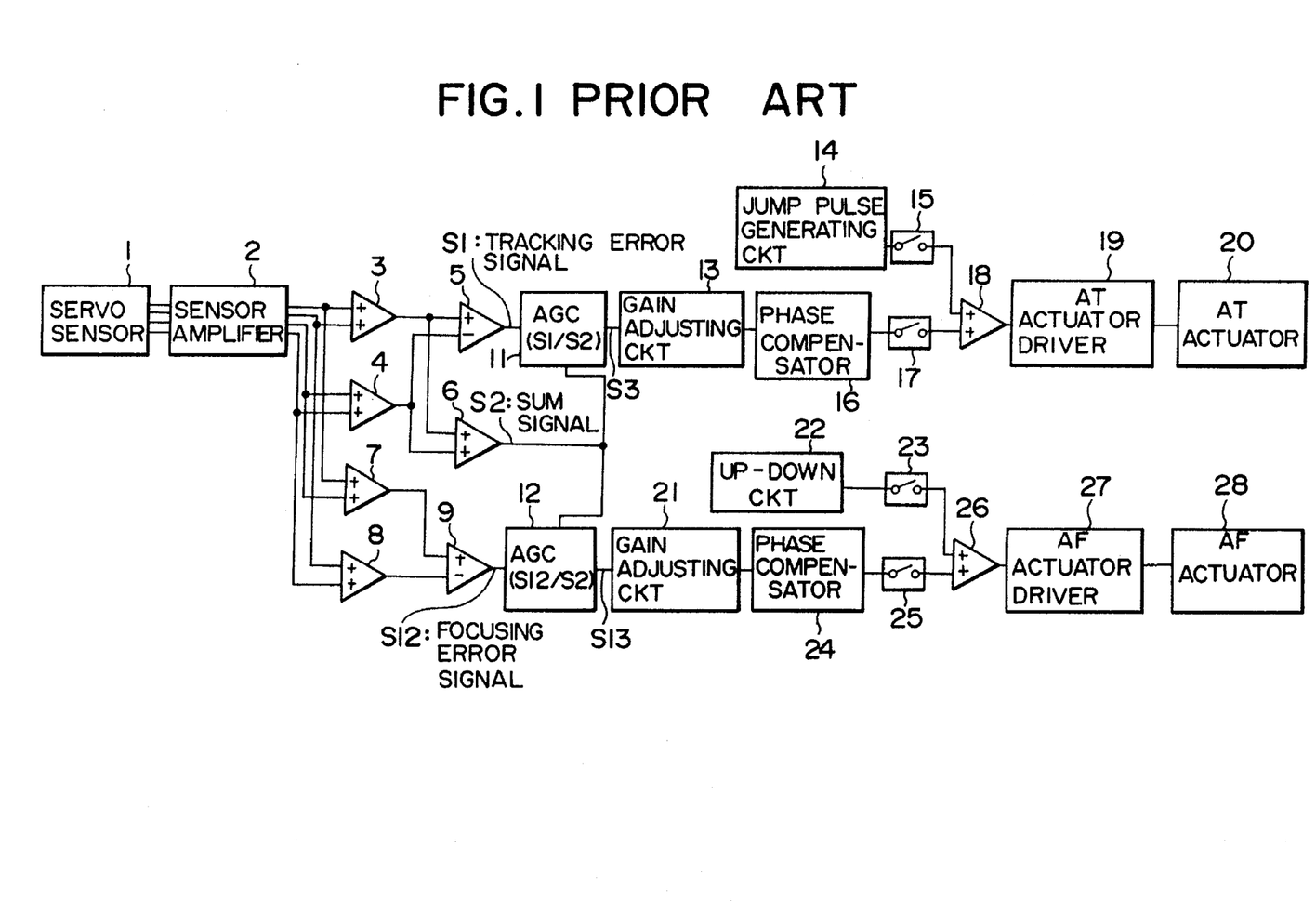
FIG. 1 is a block diagram showing tracking and focusing servo loops based on the astigmatism method and the push-pull method in an optical information recording/reproduction apparatus.

As focusing and tracking control systems adopted in a conventional optical information recording/reproduction apparatus such as an optical disk, various systems have been proposed. As a popular one of these systems, an astigmatism method and a push-pull method using a four-divided sensor are known. FIG. 1 is a block diagram showing a focusing servo loop and a tracking servo loop based on the astigmatism method and the push-pull method.

Figures 2A, 2B:
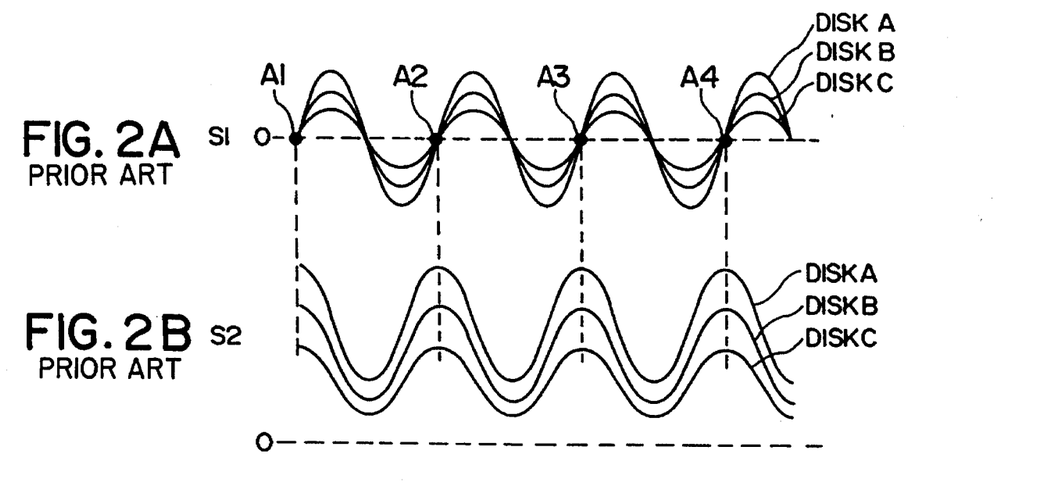
FIGS. 2A and 2B are charts showing a tracking error signal and a sum signal of the servo loop shown in FIG. 1 in correspondence with three disks having different reflectances.

Referring to FIG. 1, a four-divided sensor 1 receives light reflected by an optical disk, and a sensor amplifier 2 amplifies outputs from the four sensor portions. The outputs from the sensor amplifiers 2 are analog calculated using adders 3 and 4 and a subtracter 5, thus generating a tracking error signal S1. FIGS. 2A and 2B show signals obtained when an optical head crosses an information track. As shown in FIG. 2A, the tracking error signal S1 has a sine waveform having one track as one period, and 0-level points A1 to A4 in FIG. 2A represent on-track points.

An adder 6 outputs a signal reflecting a total light amount received by the four-divided sensor 1, i.e., a sum signal S2. As shown in FIG. 2B, the sum signal S2 also has a waveform similar to a sine waveform having one track as one period. In general, the sum signal S2 has maximum peaks at on-track (on-land) points and has minimum peaks at on-groove points, and has a sine waveform whose phase is shifted by 90° from that of the tracking error signal S1. Three curves A, B, and C shown in FIGS. 2A and 2B will be described below.

Even in optical disks manufactured by the same manufacturing method, a variation in various parameters cannot be avoided. An information recording/reproduction light beam is reflected by or transmitted through an optical disk, is incident on the sensor, and is converted into a servo signal or an information signal. At this time, if disks have different reflectances (transmittances), signals having different levels are obtained, as shown in FIGS. 2A and 2B. More specifically, the signals S1 and S2 change due to a variation in reflectance of the three disks A, B, and C, as shown in FIGS. 2A and 2B. However, since the levels of the signals S1 and S2 are proportional to the reflectance (transmittance) of each disk, a normalized tracking error signal S3 from which a variation in reflectance (transmittance) is canceled can be obtained by calculating S1/S2 using an AGC (automatic gain control circuit) 11. Even with the same disk, if different optical heads are used, to read the disk the same phenomenon as above is observed due to a variation in transmittance of an optical system or a variation in sensitivity of a sensor. However, a signal obtained in such a case can be converted into a normalized signal by the AGC 11.

The normalized tracking error signal S3 is input to a tracking actuator driver 19 via a gain adjusting circuit 13, a phase compensator 16 and a switch 17 which are arranged to stabilize a servo system, and an adder 18. The driver 19 drives an AT (auto-tracking) actuator 20 on the basis of the tracking error signal S3, thus executing tracking control. In order to correct factors which cannot be corrected by the AGC 11 such as variations in the gain of the AT actuator 20 and the electrical system, and the like, manual or automatic adjustment is performed using the gain adjusting circuit 13. When a light beam is moved to a desired information track, the switch 17 is turned off and a switch 15 is turned on, so that a driving signal from a jump pulse generating circuit 14 is supplied to the AT actuator 20. Thus, a so-called track jump operation for forcibly moving the AT actuator 20 toward the target track is performed.

Figure 3A:
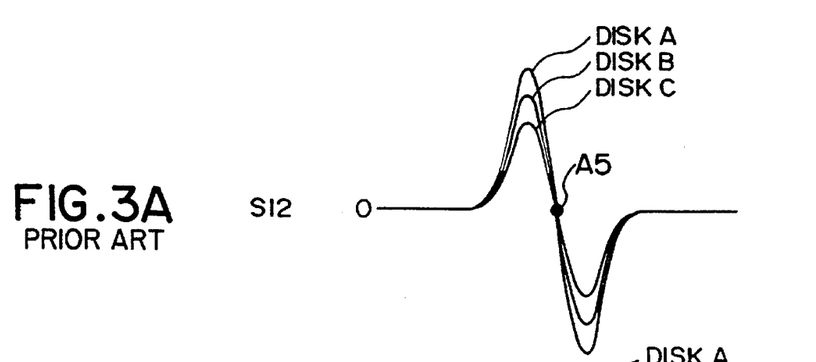
FIGS. 3A and 3B are charts showing a focusing error signal and a sum signal of the servo loop shown in FIG. 1 in correspondence with three disks having different reflectances.
Figure 3B:
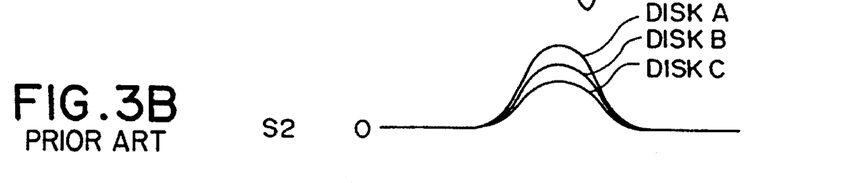

On the other hand, the focusing error signal based on the astigmatism method is obtained as an output S12 as a result of analog calculations using adders 7 and 8 and a subtracter 9. FIGS. 3A and 3B show signals of the respective units near an in-focus point. The focusing error signal S12 is a sine wave for one period, which has 0 level at an in-focus point A5, as shown in FIG. 3A. On the other hand, a sum signal is obtained as a signal shown in FIG. 3B. Since the levels of these signals change due to a variation in reflectance (transmittance) of disks or a variation in the optical heads, as shown in FIGS. 3A and 3B, a normalized focusing error signal S13 is generated by calculating S12/S2 using an AGC (automatic gain control circuit) 12.

The normalized focusing error signal S13 is input to an AF (auto-focus) actuator 28 via a gain adjusting circuit 21, a phase compensator 24, a switch 25, an adder 26, and an AF actuator driver 27. When the AF actuator 28 is driven based on the focusing error signal S13, focusing control is executed. Upon insertion of a disk, an output signal from an up-down circuit 22 is directly supplied to the AF actuator driver 27 by turning off the switch 25 and turning on a switch 23. Thus, the AF actuator 28 is forcibly pulled up/down to drive an objective lens in the focusing direction, thus performing an AF pull-in operation near an in-focus point. At this time, the focusing error signal changes in an S-pattern, as shown in FIG. 3A, and an AF pull-in is attained by turning off the switch 23 and turning on the switch 25 near the in-focus point A5 of this signal.

The arrangement of the AGC 11 will be described below with reference to FIG. 4. The AGC 11 is a circuit for normalizing the tracking error signal S1 by dividing the tracking error signal S1 by the sum signal S2. A multiplier 30 is a circuit for multiplying two input signals S2 and S8 and outputting an output signal S7. In this case, the multiplier 30 outputs the signal S7=G1·S2·S8 (where G1 is the gain constant). An operational amplifier 29 outputs the signal S8 to the multiplier 30, and the signal S8 is negatively fed back to the operational amplifier 29. An offset adjusting volume 39 is set at 0 level, and if the operational amplifier 29 has a sufficiently large open-loop gain at that time, the signal S8 is given by:

$$S8=S1/(G1 \cdot S2) \tag{1}$$

Therefore, an error signal obtained by normalizing the tracking error signal S1 by the sum signal S2 appears as the output from the operational amplifier 29.

However, in an actual circuit, the signal S8 is influenced by an input offset $V_{ofst1}$ of the operational amplifier 29 and an input offset $V_{ofst2}$ of the multiplier 30. At this time, an offset $V_{ofst}$ generated in the signal S8 when S1=0 is given by:

$$V_{ofst}=V_{ofst1}/(G1 \cdot S2)+V_{ofst2} \qquad (2)$$

Figure 5:
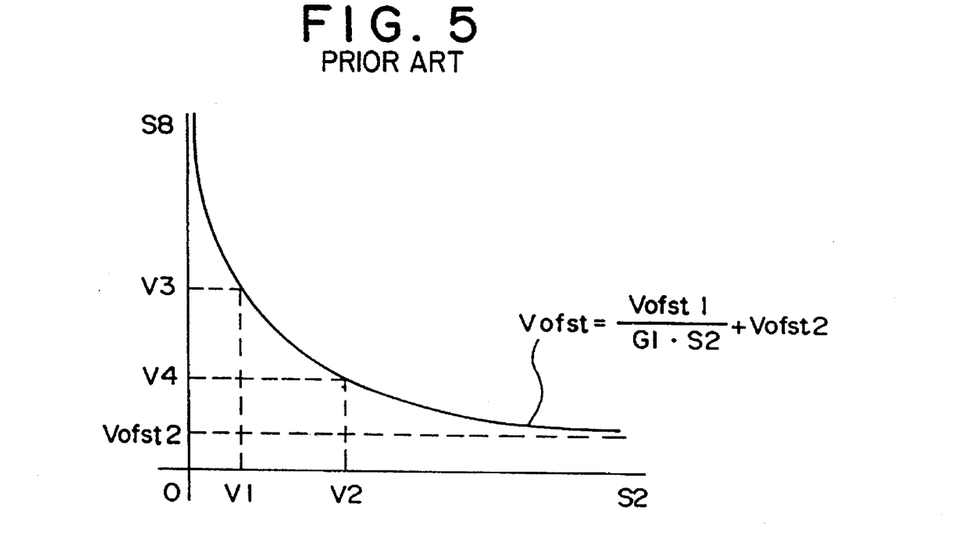
FIG. 5 is a graph showing the relationship between a sum signal S2 of the gain adjusting circuit and an output S8 from an operational amplifier 29.

The offset $V_{ofst}$ is represented by a curve shown in FIG. 5. More specifically, of the offset components appearing in the signal S8, the input offset of the operational amplifier 29 is inversely proportional to S2, and the input offset of the multiplier 30 is constant.

Figure 6A:
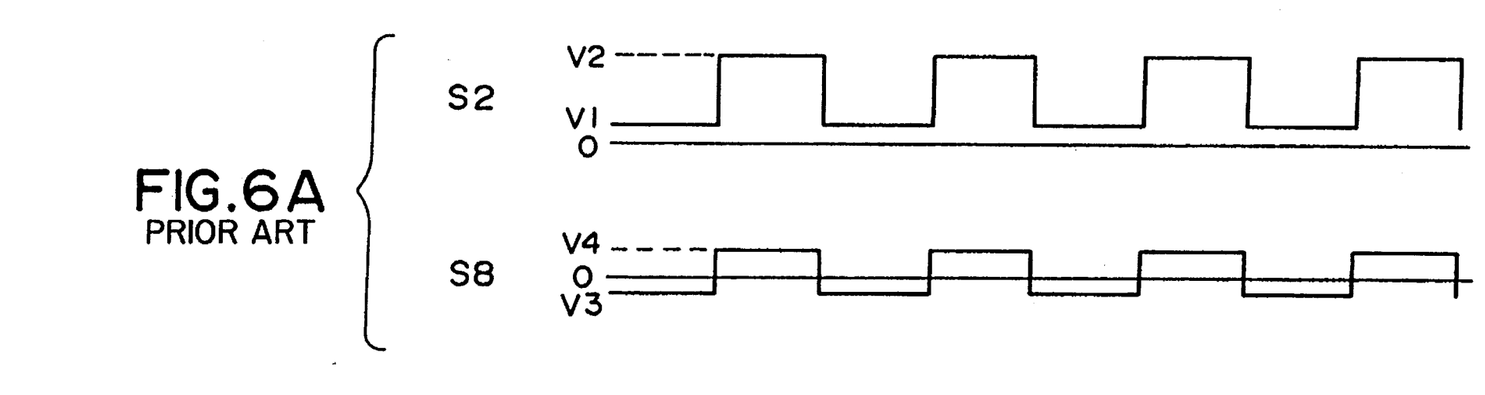
FIGS. 6A and 6B are charts for explaining an offset adjusting operation of the gain adjusting circuit shown in FIG. 4.
Figure 6B:
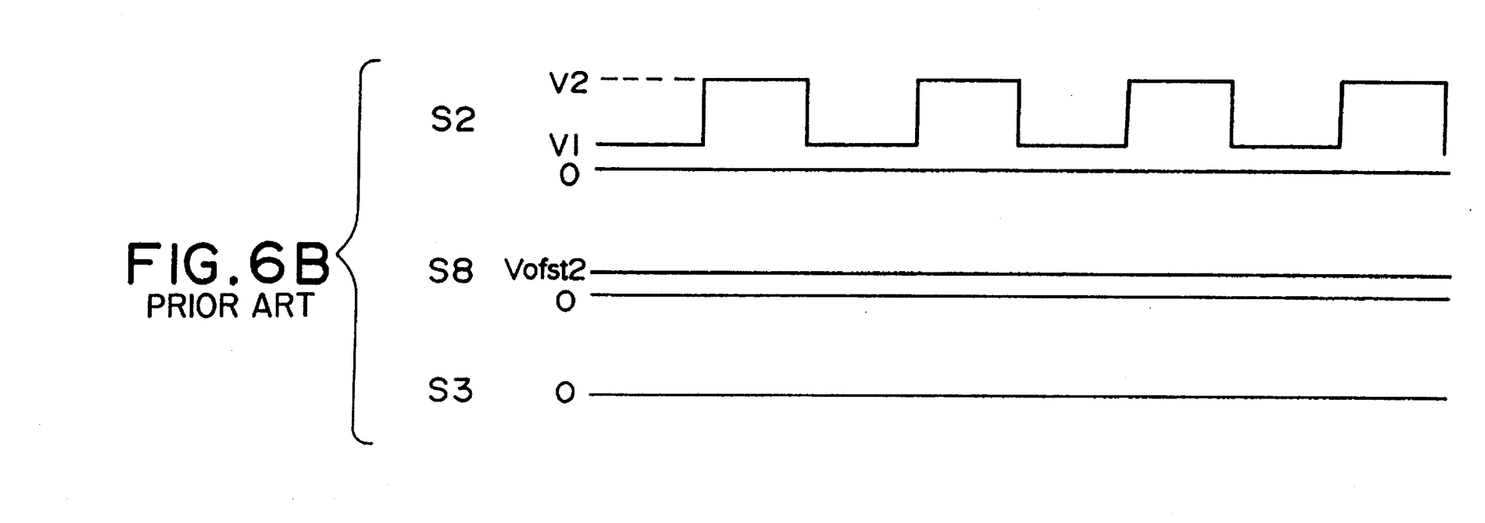

Since the sum signal S2 is a signal reflecting the total light amount of light reflected by a disk, when the level of the signal S2 changes from V1 to V2 due to a variation in power of a semiconductor laser or a variation in reflectance of the disk, the offset generated in the signal S8 also changes. For this reason, the offset adjusting volume 39 and an offset adjusting volume 40 are added to allow independent adjustment of $V_{ofst1}$ and $V_{ofs2}$, and a voltage is forcibly applied from an external circuit to S2 in a state wherein no disk is inserted, thereby changing the signal S2, as shown in FIG. 6A. With this operation, offsets corresponding to V1 and V2 appear in the signal S8. Since a change in output S8 at that time is caused by the input offset of the operational amplifier 29, the volume 39 is adjusted, so that the signal S8 is not changed by S2, as shown in FIG. 6B. In this case, a constant offset which is left unadjusted corresponds to $V_{ofst2}$. When this offset is adjusted using the volume 40 to obtain the output S3 having a 0 offset, the offset adjustment of the AGC 11 is completed.

The above description has been given in association with tracking servo and the AGC 11. In the AGC 12, the same offset adjustment as described above can be performed by inputting the focusing error signal S12 in place of the tracking error signal S1.

In general, in an optical disk apparatus, when a light beam irradiates an optical disk, the light beam emitted from a semiconductor laser in a light source is focused by an objective lens, and the focused light beam irradiates the optical disk as a light spot having a spot size of about 1 μm. Such a light spot is controlled to be scanned to track an information track on the optical disk while being focused on the medium surface of the optical disk by feedback control called focusing servo and feedback control called tracking servo. In these feedback control operations, a position error between the light spot and the optical disk surface and a position error between the light spot and the information track are detected on the basis of the output from a sensor for detecting light reflected by the disk, and the objective lens is moved in the focusing and tracking directions in correspondence with these errors, thus attaining the focusing control and the tracking control of the light spot.

Figure 4:
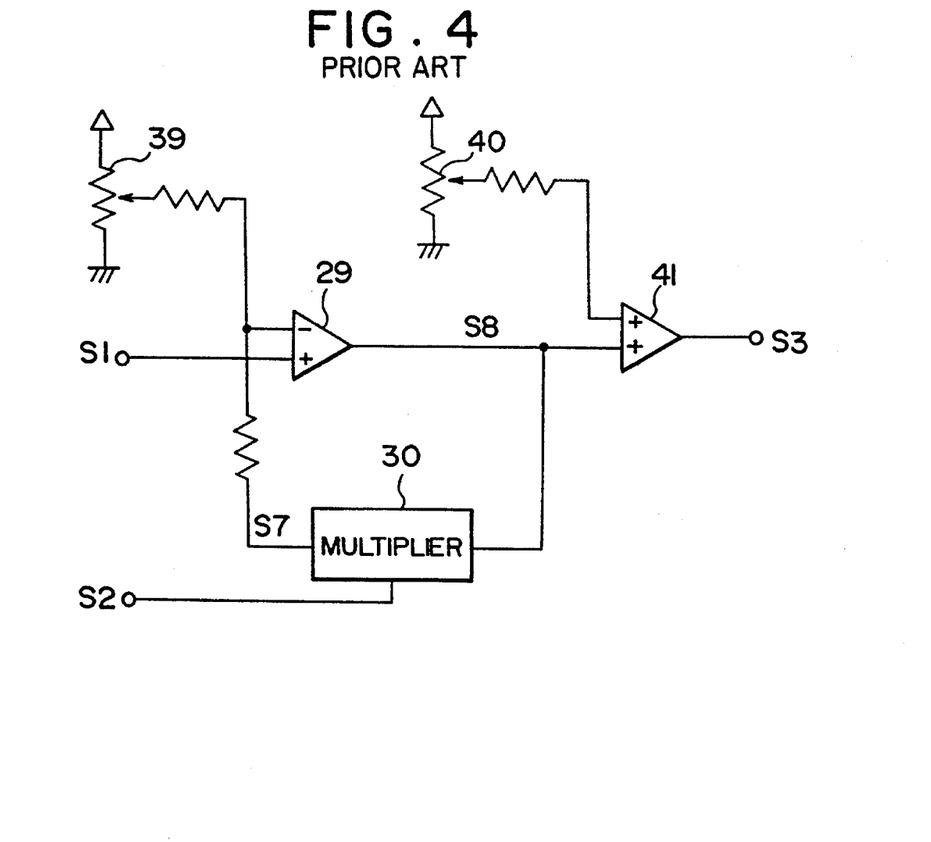
FIG. 4 is a circuit diagram showing the arrangement of a gain adjusting circuit of the tracking servo loop shown in FIG. 1.

However, in the AGC shown in FIG. 4, since the volumes are adjusted while forcibly inputting a voltage to a terminal which should receive the sum signal, adjustment is limited to initial adjustment before a circuit board is delivered. For this reason, a change in offset due to temperature characteristics or aging of an element cannot be adjusted, and focusing servo and tracking servo become unstable. In addition, the adjustment process is complicated.

The control gains of the above-mentioned tracking and focusing control loops are not constant due to variations of the reflectance of a recording disk, the servo signal characteristics of the disk, the sensitivity of an object lens actuator, and the like. For this reason, if the control gains are too large, in the worst case, the control loops oscillate and not only can information not be satisfactorily recorded/reproduced but also recorded data may be destroyed. Thus, a method of automatically adjusting the gains of the control loops has been proposed. However, in order to adjust the control loops, the loop gains must be measured. However, when the loop gains are measured, the control loops become unstable, and the gains cannot be adjusted to required values due to the influence of signals input to the loops, resulting in oscillation of the control loops.

SUMMARY OF THE INVENTION

The present invention has been made in consideration of the conventional problems, and has as its object to provide an automatic gain control device for a servo loop, which allows adjustment of offsets as needed by automatically calculating input offsets of an operational amplifier and a multiplier, and can assure stable operations of focusing and tracking servo loops independently of the temperature characteristics and aging of the elements thereof.

It is another object of the present invention to provide an automatic gain control device for a servo loop, which sets the gains of servo loops to be values lower by a predetermined amount than target values on the basis of measured gains upon adjustment of the gains of the servo loops, and re-adjusts the gains of the servo loops to the target values after this adjustment, thereby allowing stable gain adjustment of the servo loops without oscillation of the servo loops.

In order to achieve the above objects, according to the present invention, there is provided an automatic gain control device which inputs an error signal generated based on output signals from a divided sensor to an operational-amplifier, inputs a sum signal of the output signals from the divided sensor to a multiplier, and divides the error signal by the sum signal by negatively feeding back an output signal from the operational amplifier to the operational amplifier via the multiplier, comprising: means for alternately applying two predetermined voltages to the multiplier in a state wherein the sum signal is 0; means for detecting amplitudes of output signals from the automatic gain control device corresponding to the two voltages; and means for cancelling input offsets of the operational amplifier and the multiplier by calculating the input offsets of the operational amplifier and the multiplier on the basis of the detected amplitudes of the signals, the two voltages, and a gain of the multiplier. An information recording and/or reproduction apparatus according to the present invention comprises the above-mentioned automatic gain control device according to the present invention.

According to the present invention, there is also provided an automatic gain control device for adjusting a gain of a servo loop, comprising: gain varying means, arranged in the servo loop, for varying the gain of the servo loop; applying means for applying a signal of a predetermined frequency to the servo loop; gain calculating means for detecting a signal of the servo loop and calculating the gain of the servo loop in a state wherein the applying means applies the signal; and means for adjusting the gain of the gain varying means on the basis of the gain calculated by the gain calculating means, so that the gain of the servo loop has a target value, wherein the means sets the gain of the servo loop to be the target value by adjusting the gain of the gain varying means so that the gain of the servo loop has a value lower than the target value by a predetermined amount, and thereafter, increasing the gain of the gain varying means by the predetermined amount. An information recording and/or reproduction apparatus according to the present invention comprises the above-mentioned automatic gain control device according to the present invention.

According to the present invention, there is also provided an automatic gain control method which inputs an error signal generated based on output signals from a divided sensor to an operational amplifier, inputs a sum signal of the output signals from the divided sensor to a multiplier, and divides the error signal by the sum signal by negatively feeding back an output signal from the operational amplifier to the operational amplifier via the multiplier, comprising the steps of:

alternately applying two predetermined voltages to the multiplier in a state wherein the sum signal is 0;

detecting amplitudes of output signals from the automatic gain control device corresponding to the two voltages; and cancelling input offsets of the operational amplifier and the multiplier by calculating the input offsets of the operational amplifier and the multiplier on the basis of the detected amplitudes of the signals, the two voltages, and a gain of the multiplier.

According to the present invention, there is also provided an automatic gain control method for adjusting a gain of a servo loop, comprising the steps of:

applying a signal of a predetermined frequency to the servo loop;

detecting a signal of the servo loop and calculating the gain of the servo loop in a state wherein the signal is applied in the step of applying the signal; and adjusting the gain of a variable gain amplifier arranged in the servo loop on the basis of the gain calculated in the step of calculating the gain, so that the gain of the servo loop has a target value, wherein this step includes the step of setting the gain of the servo loop to be the target value by adjusting the gain of the variable gain amplifier so that the gain of the servo loop has a value lower than the target value by a predetermined amount, and thereafter, increasing the gain of the variable gain amplifier by the predetermined amount.

DETAILED DESCRIPTION OF THE PREFERRED EMBODIMENTS

Figure 7:
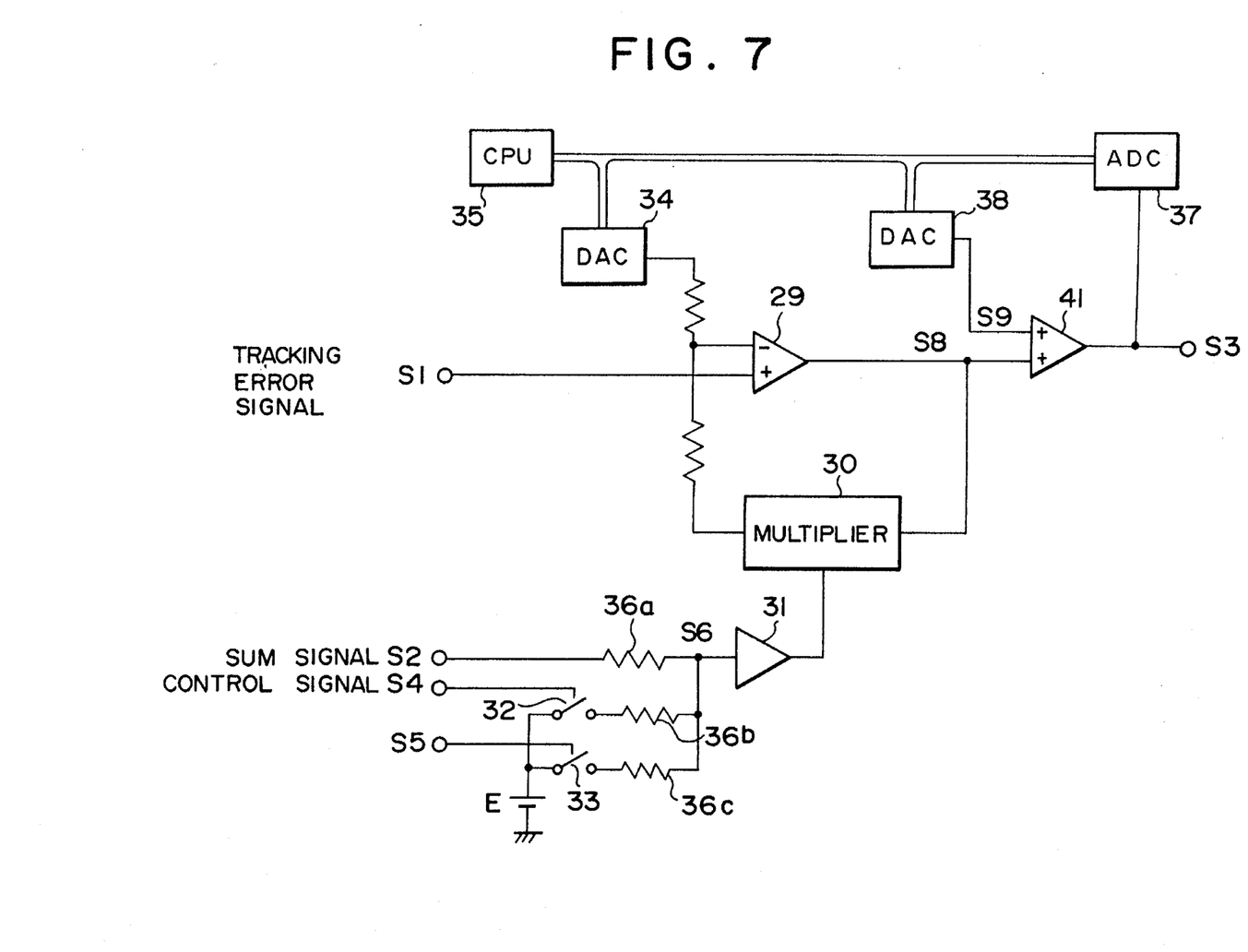
FIG. 7 is a circuit diagram showing an embodiment of an automatic gain control device for a servo loop according to the present invention.

The preferred embodiments of the present invention will be described in detail below with reference to the accompanying drawings. FIG. 7 is a circuit diagram showing an embodiment of an automatic gain control device for a servo loop according to the present invention. Note that the same reference numerals in FIG. 7 denote the same parts as in the conventional device shown in FIG. 4, and a detailed description thereof will be omitted. Referring to FIG. 7, a buffer amplifier 31 is connected to switches 32 and 33 which are respectively ON/OFF-controlled by control signals S4 and S5. When the switches 32 and 33 are ON, a predetermined voltage E is input to the buffer amplifier 31 via resistors 36b and 36c. In a normal operation state of the device, the switches 32 and 33 are OFF, and a sum signal S2 output from the adder 6 shown in FIG. 1 is input to the buffer amplifier 31 via a resistor 36a. Therefore, in the normal state, the output signal from the buffer amplifier 31 becomes a signal reflecting only the sum signal S2, and is supplied to a multiplier 30.

The multiplier 30 and an operational amplifier 29 constitute a division circuit for dividing a tracking error signal S1 by the sum signal S2, and with this division, a normalized tracking error signal S3 is generated. A CPU (Central Processing Unit) 35 calculates input offsets of the operational amplifier 29 and the multiplier 30, as will be described later. D/A conversion circuits (DACs) 34 and 38 respectively supply voltage values for canceling the input offsets to the operational amplifier 29 and an adder 41 on the basis of an instruction from the CPU 35. An A/D conversion circuit (ADC) 37 is used for fetching the output signal S3 from the adder 41 by the CPU 35.

The offset adjusting operation of this embodiment will be described below. More specifically, in this embodiment, since the input offsets of the operational amplifier 29 and the multiplier 30 are automatically adjusted prior to the beginning of a tracking control operation, the adjusting operation will be described in detail below. When an optical disk such as a recording medium is set in an optical information recording/reproduction apparatus, the switch 32 is turned on by the control signal S4 before a semiconductor laser in a recording/reproduction light source is turned on. Thus, the voltage E is input to the buffer amplifier 31 via the switch 32 and the resistor 36b. On the other hand, the sum signal S2 is input to the buffer amplifier 31 via the resistor 36a. In this case, since the semiconductor laser in the light source is OFF, the sum signal S2 has 0 level.

Therefore, when constants of the respective elements are selected so that the amplitude level of an input signal S6 to the buffer amplifier 31 at that time becomes equal to V1 described above with reference to FIG. 5, V1 is given by:

$$V1 = E \cdot R_{36a}/(R_{36a} + R_{36b}) \qquad (3)$$

where $R_{36a}$ is the resistance of the resistor 36a, and $R_{36b}$ is the resistance of the resistor 36b. This voltage V1 is input to the buffer amplifier 31. Since the output signal S3 of the automatic gain control device at that time corresponds to V3 described above with reference to FIG. 5, the signal S3 is converted into a digital signal by the ADC 37, and the digital signal is fetched by the CPU 35.

Then, the switch 32 is turned off by the control signal S4, and the switch 33 is turned on by the control signal S5. The light source is kept OFF. When constants of the respective elements are selected so that the level of the input signal S6 to the buffer amplifier 31 at that time becomes equal to V2 described above with reference to FIG. 5, V2 is given by:

$$V2 = E \cdot R_{36a}/(R_{36a} + R_{36c}) \quad (4)$$

where $R_{36c}$ is the resistance of the resistor 36c. This voltage V2 is similarly input to the buffer amplifier 31. Since the output signal S3 of the automatic gain control device at that time corresponds to V4 described above with reference to FIG. 5, the signal S3 is also converted into a digital signal by the ADC 37, and the digital signal is fetched by the CPU 35. In this case, when the switches 32 and 33 are alternately and continuously turned on/off by the control signals S4 and S5, the operation described above with reference to FIGS. 6A and 6B is attained, and the output signal S8 from the operational amplifier 29 changes in a rectangular wave pattern between V3 and V4, as shown in FIG. 6A.

Then, the CPU 35 calculates the input offset $V_{ofst1}$ of the operational amplifier 29 and the input offset $V_{ofst2}$ of the multiplier 30 using equation (2) above on the basis of V1 and V2, and a gain G1 of the multiplier 30, which are known, and V3 and V4 fetched via the ADC 37. More specifically, the CPU 35 executes calculation processing given by the following equations to calculate $V_{ofst1}$ and $V_{ofst2}$:

$$V_{ofst1} G1 \cdot (V4-V3) \cdot V1 \cdot V2/(V1-V2) \quad (5)$$

$$V_{ofst2} = V4 - V_{ofst1}/(G1 \cdot V2) \quad (6)$$

Furthermore, the CPU 35 sets values for canceling the input offset values in the DACs 34 and 38 on the basis of the calculated offset values. In this case, the input offset $V_{ofst1}$ of the operational amplifier 29 is canceled by setting the value for canceling the offset in the DAC 34, and an offset generated in the output from the operational amplifier 29 becomes constant independently of the level of the sum signal S2. This constant offset remains as the input offset $V_{ofst2}$ of the multiplier 30. Thus, a value for canceling this offset is set in the DAC 38 as a signal S9, and the output from the DAC 38 is supplied to the adder 41. As a result, the offset generated in the output signal S3 is completely canceled, and a normalized tracking error signal S3 free from the influence of the offset is generated.

Upon completion of the offset adjustment, the switches 32 and 33 are maintained in an OFF state by the control signals S4 and S5, and the semiconductor laser in the light source is turned on. Then, the focusing servo and the tracking servo are sequentially enabled, and the apparatus can perform a recording/reproduction operation. In the normal operation state of the apparatus, the operational amplifier 29 and the multiplier 30 serve as a division circuit for dividing the tracking error signal S1 by the sum signal S2, as described above, and the tracking servo loop shown in FIG. 1 executes tracking control using the tracking error signal S3 normalized by this division circuit. In this embodiment, the switches 32 and 33 are alternately turned on/off. Alternatively, the offset adjustment may be performed by turning on/off one switch while the other switch is kept ON.

In this embodiment, since the input offsets of the operational amplifier 29 and the multiplier 30 are automatically calculated and canceled before tracking control, the offset adjustment is not limited to initial adjustment before delivery of circuit boards but can be performed as needed. Thus, a variation in gain of the servo loop due to the temperature characteristics and aging of the elements can be adjusted sufficiently to compensate for these factors. Therefore, since the gain of the tracking servo loop can always be maintained to be an optimal value, the servo loop can always be stably operated. Since all offset adjustment operations from calculations of offsets until setting of values for canceling the calculated offsets are automatically performed, the adjusting process before delivery of circuit boards is not required unlike in the conventional device, and the manufacturing process of the apparatus can be simplified accordingly.

Figure 8:
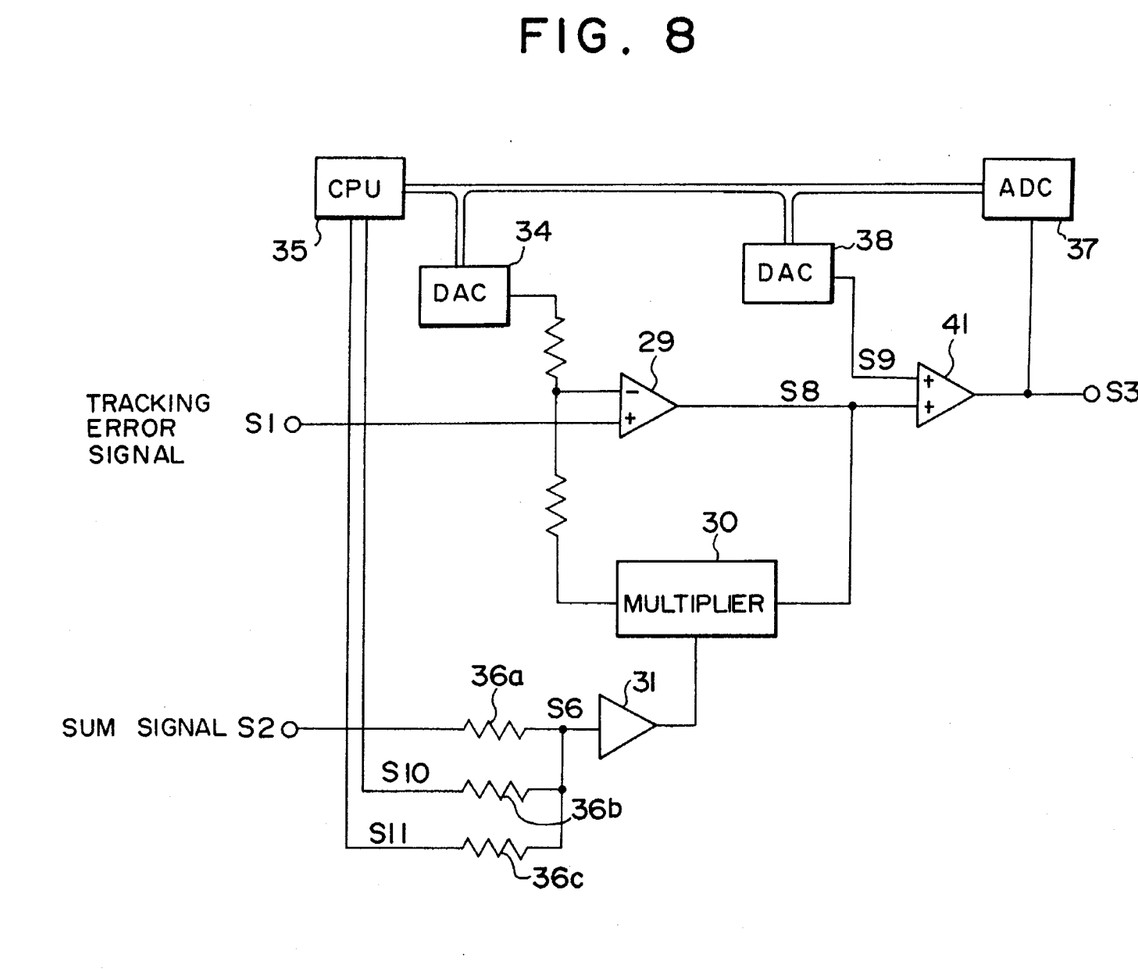
FIG. 8 is a circuit diagram showing another embodiment of the present invention.

FIG. 8 is a circuit diagram showing another embodiment of the present invention. In this embodiment, input/output ports of the CPU 35 are directly connected to the resistors 36b and 36c without using the switches 32 and 33. Other arrangements are the same as those shown in FIG. 7. In general, the input/output port of the CPU 35 becomes "0" (0 V) or "1" (5 V) when it is set in an output mode, and has a high impedance when it is set in an input mode. Thus, this embodiment utilizes this fact, and switches a signal S10 between the output and input modes to turn on/off the input signal S10 like in a case wherein the switch 32 is turned on/off, thereby changing the potential of the signal S6. Also, the input signal S11 is similarly switched to change the potential of the signal S6.

Therefore, in the normal operation state of the apparatus, when the signals S10 and S11 are set in the input mode (high-impedance), since the output signal from the buffer amplifier 31 becomes a signal which directly reflects the sum signal S2, the normalized tracking error signal S3 obtained by dividing the tracking error signal S1 by the sum signal S2 is generated. On the other hand, when the offsets are to be adjusted, the signals S10 and S11 are alternately switched to the "1" output mode before the semiconductor laser in the light source is turned on, thereby changing the potential of the signal S6 between V1 and V2. The potential of the signal S3 at that time is fetched by the CPU 35 via the ADC 37, and the CPU 35 calculates $V_{ofst1}$ and $V_{ofst2}$ using the fetched value and the known values V1, V2, and G1. The CPU 35 sets values for canceling the offsets in the DACs 34 and 38 on the basis of the calculation result, thereby adjusting the input offsets of the operational amplifier 29 and the multiplier 30. As described above, in this embodiment as well, the same effect as in the embodiment shown in FIG. 7 can be obtained.

In each of the embodiments described above, the automatic gain control device for a tracking error signal has been described. In an automatic gain control device for a focusing error signal, offsets can be adjusted by the same arrangement as described above. In this embodiment, the offsets are adjusted when a disk is inserted in the apparatus. However, the adjustment timing is not limited to this. For example, the offset adjustment may be performed when the power switch of the apparatus is turned on, or may be periodically performed when the apparatus is in a standby state.

Further, the present invention may be applied to the case in which the multiplier 30 is not substantially provided in the embodiments shown in FIG. 7 and FIG. 8.

Figure 9:
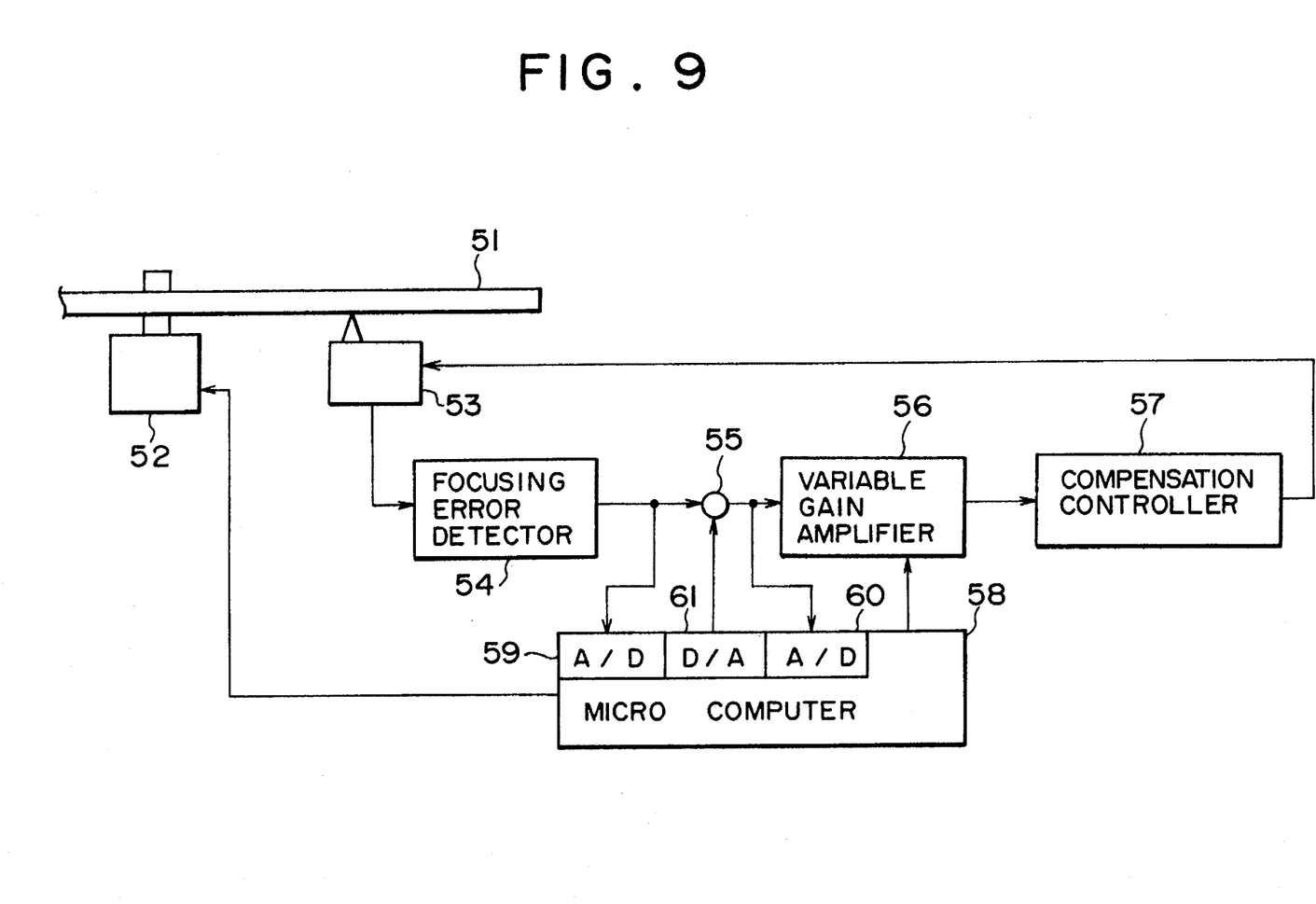
FIG. 9 is a block diagram showing still another embodiment of the present invention.

FIG. 9 is a block diagram showing still another embodiment of the present invention. Referring to FIG. 9, an optical disk 51 as an information recording medium is rotated by a spindle motor 52 at a predetermined speed of, e.g., 3,600 rpm. An optical head 53 irradiates the optical disk 51 with a recording/reproduction light beam, and detects light reflected by the optical disk 51. The optical head 53 comprises a semiconductor laser as a light source, an objective lens for focusing the laser beam to a very small light spot, focusing and tracking actuators for driving the objective lens respectively in the focusing and tracking directions, a photodetector for detecting light reflected by the optical disk 51, and the like.

A focusing error detector 54 detects a focusing error signal on the basis of the detection signal from the photodetector in the optical head 53. An adder 55 supplies a signal instructed by a microcomputer 58 to a focusing control loop. A variable gain amplifier 56 varies the gain of the focusing control loop in accordance with an instruction from the microcomputer 58. A compensation controller 57 performs phase compensation of the focusing error signal to stabilize the focusing control loop. The compensation controller 57 includes a driver for the focusing actuator in the optical head 53. When the actuator is driven by this driver to move the objective lens in the focusing direction, focusing control is attained. Although not shown in FIG. 9, a tracking control loop constituted by a tracking error detector for detecting a tracking error signal, a compensation controller for the tracking error signal, and the like is also arranged. The compensation controller includes a driver for driving the tracking actuator in the optical head 53. When the tracking actuator is driven by this driver to move the objective lens in the tracking direction, tracking control is attained.

The microcomputer 58 is a digital control circuit for systematically controlling the entire apparatus, and includes A/D converters 59 and 60, and a D/A converter 61. The microcomputer 58 controls the sequence of the entire apparatus in accordance with a predetermined control program, and controls the adjustment operation of the gain of the focusing control loop, as will be described later.

The operation of this embodiment will be described below. When the apparatus is started or when the optical disk 51 is loaded into the apparatus main body, the spindle motor 52 is started upon an instruction from the microcomputer 58, and the optical disk 51 begins to be rotated. When the rotational speed of the optical disk 51 has reached a predetermined speed, the microcomputer 58 turns on the semiconductor laser in the optical head 53, and thereafter, sequentially enables the focusing and tracking control loops. When the focusing control loop is closed, the microcomputer 58 starts gain adjustment of the focusing control loop.

When the loop gain of the focusing control loop is to be adjusted, the zero-crossing frequency in the open loop characteristics is set to be 3 kHz as a final adjustment target although the zero-crossing frequency (gain=0 dB) in the open loop characteristics is commonly 1 kHz to several kHz. Upon adjustment of the loop gain, the microcomputer 58 outputs a sine wave of 3 kHz to the adder 55 via the D/A converter 61 to supply a sine wave signal of 3 kHz into the focusing control loop. The microcomputer 58 monitors signals in the focusing control loop via the A/D converters 59 and 60. At this time, the signals fetched via the A/D converters 59 and 60 have a frequency component of 3 kHz supplied via the D/A converter 61. In addition, since the transfer characteristics (open loop characteristics) throughout the focusing control loop correspond to transfer characteristics from a monitor point of the A/D converter 60 to that of the A/D converter 59 via the variable gain amplifier 56, the compensation controller 57, the focusing actuator and the photodetector in the optical head 53, and the focusing error detector 54, the gain of the focusing control loop can be measured by measuring the signal amplitude ratio between these A/D converters 59 and 60.

More specifically, the microcomputer 58 divides a signal amplitude value $A_1$ fetched via the A/D converter 59 by a signal amplitude value $A_2$ fetched via the A/D converter 60 to calculate the gain ($A_1/A_2$) of the focusing control loop. The microcomputer 58 then adjusts the open loop gain to be a value lower than 0 dB as the final target on the basis of the calculated loop gain. In this embodiment, the open loop gain is adjusted to −2 dB. More specifically, when the measured gain is lower than −2 dB, the microcomputer 58 adjusts the gain of the focusing control loop to increase the gain of the variable gain amplifier 56; when the measured gain is higher than −2 dB, the microcomputer 58 adjusts the gain of the focusing control loop to decrease the gain of the variable gain amplifier 56.

The gain of the variable gain amplifier 56 is preferably adjusted stepwise in, e.g., 0.5-dB steps to improve gain measurement precision and to allow stable gain adjustment. More specifically, for example, when the measured loop gain is higher than −2 dB, the gain of the variable gain amplifier 56 is decreased by 0.5 dB, and the gain of the focusing control loop is measured again. As a result, when the gain of the loop is still higher than −2 dB, the gain of the variable gain amplifier 56 is decreased by 0.5 dB again. In this manner, it is preferable that the measurement of the gain of the focusing control loop and the operation for varying the gain of the variable gain amplifier 56 by a predetermined amount be repetitively performed. Since such a method of repeatedly changing the gain by a predetermined amount is a time-consuming one, if the initial gain of the focusing control loop is, e.g., −5 dB, the gain of the variable gain amplifier 56 may be increased by 2 dB. In this manner, the adjustment amount may be determined in correspondence with the measured gain. Furthermore, in this case, when the gain reaches a range in the neighborhood of a target value, it is preferable that the adjustment amount of the gain be set to be a small value (e.g., 0.5 dB).

In this manner, when the open loop gain of the focusing control loop is adjusted to −2 dB at 3 kHz, the microcomputer 58 stops application of a signal via the D/A converter 61 and fetching of signals via the A/D converters 59 and 60, and thereafter, re-sets the gain of the variable gain amplifier 56 to increase the current gain of the variable gain amplifier 56 by 2 dB. With the above-mentioned operation, the open loop characteristics of the focusing control loop are adjusted to 0 dB as a final target at 3 kHz, and the gain adjustment of the focusing servo loop is completed.

In this embodiment, upon adjustment of the loop gain of the focusing servo loop, the gain is set in advance to be a value lower than a target value, and the gain is re-set to be a final target value after adjustment. For this reason, the servo loop can be prevented from oscillation in the adjustment operation, and the gain adjustment of the servo loop can be stably performed. More specifically, when the loop gain is adjusted, the loop gain must be measured, as described above. During this measurement, the servo loop may become unstable, and may oscillate if the loop gain is high. For this reason, when the loop gain is measured and adjusted, the gain is adjusted to a lower value, thereby allowing stable adjustment of the loop gain while preventing the loop from oscillating. Therefore, even when the gain of the control loop varies due to a variation in, reflectance of a disk, the gain of the control loop can be easily adjusted. Therefore, the recording/reproduction operation of the apparatus can be stabilized without destroying recorded data.

In the above embodiment, the gain adjustment of the focusing servo loop has been exemplified. The present invention can also be applied to the gain adjustment of the tracking servo loop, the movement control of the optical head, and the like. In the above embodiment, when the gain of the open loop characteristics is measured, the input and output signals of the adder 55 are monitored. However, the present invention is not limited to this. For example, the gain of the control loop may be measured based on the amplitude ratio between the input signal of the adder 55 and a signal at an arbitrary point in the loop, or signal amplitudes at arbitrary two points in the control loop may be monitored, and the loop gain may be measured based on the amplitude ratio between these amplitudes. Furthermore, the present invention is not limited to the signal amplitude ratio. For example, the gain of the open loop characteristics may be measured by monitoring phases.

The information recording/reproduction apparatus shown in FIG. 9 may be combined with the automatic gain control device shown in FIG. 7 or 8.

As described above, according to the present invention, since the input offsets of the operational amplifier and the multiplier are automatically calculated and canceled, the adjustment timing of the gain of the servo loop is not limited to initial adjustment before delivery of circuit boards. For example, the gain can be adjusted as needed, e.g., when a recording medium is loaded. Therefore, even when the gain of the servo loop changes due to the temperature characteristics or aging of the elements, since the gain adjustment can be performed as needed, the servo loop can always be stably operated.

When the loop gain of the servo loop is adjusted, the gain of a gain varying means is adjusted on the basis of the measured loop gain, so that the gain of the servo loop has a value lower by a predetermined amount than a target value, and after this adjustment of the loop gain, the gain of the gain varying means is increased by the predetermined amount. Therefore, the gain adjustment of the servo loop can be stably performed while preventing the servo loop from oscillating during adjustment of the loop gain.

What is claimed is:

1. An automatic gain control device which inputs an error signal generated based on output signals from a divided sensor to an operational amplifier, inputs a sum signal of the output signals from the divided sensor to a multiplier, and divides the error signal by the sum signal by negatively feeding an output signal from the operational amplifier back to the operational amplifier via the multiplier, comprising:

means for alternately applying two predetermined voltages to the multiplier in a state in which the sum signal is 0;

means for detecting amplitudes of output signals from said automatic gain control device corresponding to the two predetermined voltages; and means for calculating input offsets of the operational amplifier and the multiplier on the basis of the detected amplitudes of the output signals of said automatic gain control device, two predetermined voltages, and a gain of the multiplier and for cancelling the input offsets of the operational amplifier and the multiplier.

2. A device according to claim 1, wherein the error signal is a tracking error signal or a focusing error signal of an optical head for recording or reproducing information on or from an optical information recording medium.

3. A device according to claim 1, wherein said means for alternately applying the two predetermined voltages applies the two predetermined voltages to the multiplier by alternately turning on/off two switches.

4. A device according to claim 1, further comprising a central processing unit, and wherein said means for alternately applying the two predetermined voltages applies the two predetermined voltages to the multiplier by switching input/output ports of said central processing unit between input and output modes.

5. An automatic gain control method of an automatic gain control device in which an error signal generated based on output signals from a divided sensor is inputted to an operational amplifier, a sum signal of the output signals from the divided sensor is inputted to a multiplier, and the error signal is divided by the sum signal by negatively feeding an output signal from the operational amplifier back to the operational amplifier via the multiplier, comprising the steps of:

alternately applying two predetermined voltages to the multiplier in a state wherein the sum signal is 0;

detecting amplitudes of output signals from the automatic gain control device corresponding to the two predetermined voltages; and calculating input offsets of the operational amplifier and the multiplier on the basis of the detected amplitudes of the output signals of the automatic gain control device, the two predetermined voltages, and a gain on the multiplier and cancelling the input offsets of the operational amplifier and the multiplier.

6. A method according to claim 5, wherein the error signal is a tracking error signal or a focusing error signal of an optical head for recording or reproducing information on or from an optical information recording medium.

7. A method according to claim 5, wherein the step of alternately applying the two predetermined voltages includes the step of applying the two predetermined voltages to the multiplier by alternately turning one/off two switches.

8. A method according to claim 5, wherein the step of alternately applying the two predetermined voltages includes the step of applying the two predetermined voltages to the multiplier by switching input/output ports of a central processing unit between input and output modes.

9. An information recording and/or reproducing apparatus comprising:

a recording and/or reproducing head;

driving means for displacing an information recording medium relative to said recording and/or reproducing head;

a divided sensor, arranged in said recording and/or reproducing head, for receiving information via the information recording medium; and automatic gain control means for inputting an error signal generated based on output signals from said divided sensor to an operational amplifier, inputting a sum signal of the output signals from said divided sensor to a multiplier, and dividing the error signal by the sum signal by negatively feeding an output signal from the operational amplifier back to the operational amplifier via the multiplier, said automatic gain control means comprising:

means for alternately applying two predetermined voltages to the multiplier in a state in which the sum signal is 0;

means for detecting amplitudes of output signals from said automatic gain control means corresponding to the two predetermined voltages; and means for calculating input offsets of the operational amplifier and the multiplier on the basis of the detected amplitudes of the output signals of said automatic gain control means, the two predetermined voltages, and a gain of the multiplier and for cancelling the input offsets of the operational amplifier and the multiplier.

10. An apparatus according to claim 9, wherein the error signal is a tracking error signal or a focusing error signal of said recording and/or reproducing head with respect to the information recording medium.

11. An apparatus according to claim 9, wherein said means for alternately applying the predetermined voltages applies the two predetermined voltages to the multiplier by alternately turning on/off two switches.

12. An apparatus according to claim 9, wherein said automatic gain control means further comprises a central processing unit, and said means for alternately applying the predetermined voltages applies the two predetermined voltages to the multiplier by switching input/output ports of a central processing unit between input and output modes.

13. An automatic gain control device which inputs an error signal generated based on output signals from a divided sensor to amplifying means and divides an output signal of the amplifying means by a sum signal of the divided sensor, comprising:

means for alternately applying two predetermined voltages to the sum signal in a state in which the sum signal is 0;

means for detecting amplitudes of output signals from said automatic gain control device corresponding to the two predetermined voltages; and means for calculating an input offset of said amplifying means on the basis of the detected amplitudes of the output signals of said automatic gain control device, and the two predetermined voltages and for cancelling the input offset of said amplifying means.

14. An automatic gain control method for an automatic gain control device in which an error signal generated based on output signals from a divided sensor is inputted to amplifying means and an output signal of the amplifying means is divided by a sum signal of the divided sensor, said method comprising the steps of:

alternately applying two predetermined voltages to the sum signal in a state in which the sum signal is 0;

detecting amplitudes of output signals of the automatic gain control device corresponding to the two predetermined voltages; and calculating an input offset of the amplifying means on the basis of the detected amplitudes of the output signals of the automatic gain control device and the two predetermined voltages and cancelling the input offset of the amplifying means.

15. An information recording and/or reproducing apparatus comprising:

a recording and/or reproducing head;

driving means for displacing an information recording medium relative to said recording and/or reproducing head;

a divided sensor, arranged in said recording an/or reproducing head, for receiving information via the information recording medium; and automatic gain control means for inputting an error signal generated based on output signals from said divided sensor to amplifying means and for dividing an output signal of said amplifying means by a sum signal of said divided sensor;

said automatic gain control means comprising:

means for alternately applying two predetermined voltages to the sum signal in a state in which the sum signal is 0;

means for detecting amplitudes of output signals from said automatic gain control means corresponding to the two predetermined voltages; and means for calculating an input offset of said amplifying means on the basis of the detected amplitudes of the output signals of said automatic gain control means and the two predetermined voltages and for cancelling the input offset of said amplifying means.

* * * * *

UNITED STATES PATENT AND TRADEMARK OFFICE
CERTIFICATE OF CORRECTION

PATENT NO. : 5,559,770
DATED : September 24, 1996
INVENTOR(S) : TOMOYUKI HIROKI, ET AL.

It is certified that error appears in the above-indentified patent and that said Letters Patent is hereby corrected as shown below:

COLUMN 12

Line 15, "on" should read --of--.
Line 24, "one/off" should read --on/off--.

COLUMN 14

Line 12, "an/or" should read --and/or--.

Signed and Sealed this

Fourth Day of March, 1997

Attest:

BRUCE LEHMAN

*Attesting Officer*     *Commissioner of Patents and Trademarks*